United States Patent [19]
Vaughan, Jr. et al.

[11] 3,824,715
[45] July 23, 1974

[54] RUBBER OVERSHOES

[75] Inventors: William A. Vaughan, Jr., Dover; James Clough, Wyoming, both of Del.

[73] Assignee: International Playtex Corporation, New York, N.Y.

[22] Filed: Dec. 13, 1971
(Under Rule 47)

[21] Appl. No.: 207,418

[52] U.S. Cl. .................................................. 36/7.3
[51] Int. Cl. .............................................. A43b 1/10
[58] Field of Search ............ 36/7.1, 7.3, 4, 14, 32 R

[56] References Cited
UNITED STATES PATENTS
| | | | |
|---|---|---|---|
| 2,329,209 | 9/1943 | Manson et al. | 36/4 |
| 2,439,493 | 4/1948 | Smith | 36/4 |
| 3,025,614 | 3/1962 | Bingham | 36/7.3 |
| 3,280,485 | 10/1966 | Arnold | 36/7.3 |

*Primary Examiner*—Patrick D. Lawson
*Attorney, Agent, or Firm*—Stewart J. Fried; Jeffrey A. Schwab; Michael A. Caputo

[57] ABSTRACT

Rubber overshoes in which a flock layer is embedded in and bonded to the rubber overshoe body and, preferably, an outer rubber layer is in turn bonded to the flock layer to define the outer sole of the overshoe. The composite structure imparts improved tear-resistance to the overshoe body and increases resistance of the sole portion thereof to delamination and to abrasion, the resulting product simultaneously exhibiting an attractive, esthetically pleasing appearance.

7 Claims, 3 Drawing Figures

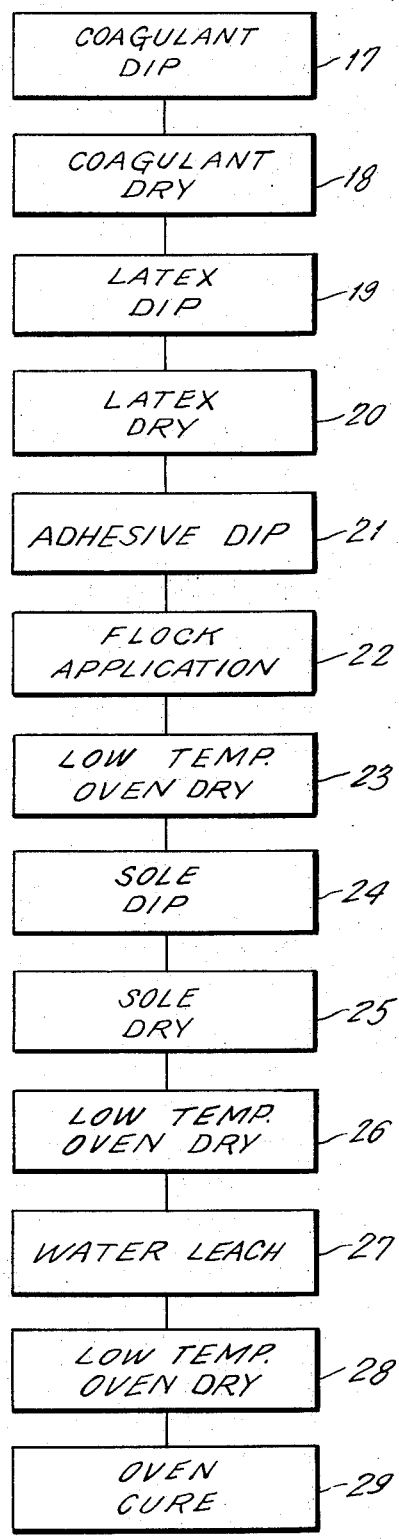
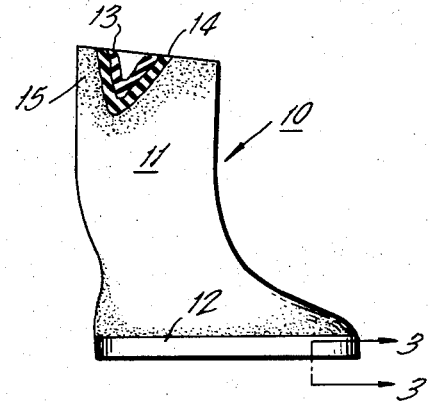
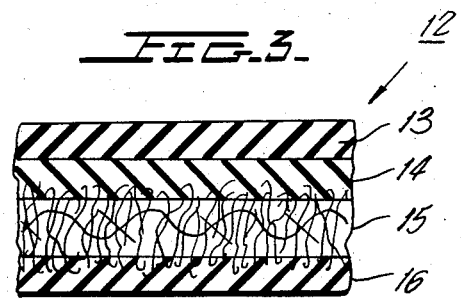

RUBBER OVERSHOES

BACKGROUND OF THE INVENTION

This invention relates to rubber footwear, and more particularly to overshoes having improved tear-resistance, and sole adhesion and abrasion-resistance, while at the same time providing improved appearance. Further, the invention relates to a process for the efficient, economical manufacture of such footwear in large scale, commercial quantities.

As used herein, the term "overshoe(s)" refers to rubber, water-resistant or repellent footwear worn over conventional, leather or plastic shoes and includes those overshoe styles commonly known as boots, rubbers, galoshes or the like. This invention is particularly applicable to rubber overshoes of the stretch type, which are conventionally produced by dip-forming rather than by compression or injection molding, which have relatively thin body sidewalls, e.g., less than about 0.050 inch and which, therefore, exhibit excellent stretch characteristics. Overshoes of this type are suitably made by dipping a form made, for example, of aluminum, an aluminum alloy, or porcelain in one or more rubber latex baths. One technique for carrying out this process is described in Marx et al U.S. Pat. No. 2,617,208, granted on Nov. 11, 1952.

It is known to add reflective material to overshoes made in accordance with the preceding or similar techniques to impart reflective, decorative effects thereto; see, for example, Pearson U.S. Pat. No. 2,607,130 of Aug. 19, 1952. It is also known that flock coatings may be applied to other footwear articles to enhance the appearance thereof (Giese U.S. Pat. No. 2,663,097 of Dec. 22, 1953). It was not, however, known prior to the present invention that rubber overshoes incorporating flock coatings can be so manufactured as to have both substantially improved mechanical characteristics, e.g., tear-resistance and sole adhesion and abrasion-resistance, and enhanced, esthetically pleasing decorative effects. These and other objects and advantages of the present invention will be more fully apparent from the following description.

SUMMARY OF THE INVENTION

In accordance herewith, an overshoe is provided which comprises a body constituted of a flexible rubber and, on at least upper portions of the body, a flock layer embedded in and bonded thereto. Such flock layer may be applied to only restricted areas of the overshoe body, thus providing any desired decorative effect. Alternatively, and preferably, the flock layer is embedded in and bonded to the entire outer surface of the overshoe body including both the sole and upper portions thereof; in such instance, a further flexible rubber layer is bonded to the flock layer in the region of the sole of the overshoe to define the outer sole thereof.

It has been found that the provision of the noted flock layer in the overshoe product increases tear-resistance of the relatively thin, flexible rubber body thereof. Moreover, the flock fibers effectively anchor the outer rubber sole layer to the inner rubber laminae and thereby decrease the risk of delamination after prolonged use. Yet further, the fibrous particles facilitate increased rubber pick-up during dip-coating in conventional latex baths and thus provide overshoes having outer sole layers exhibiting improved abrasion-resistance.

At the same time, and as indicated hereinabove, the flock layer on the upper portion or portions of the overshoe body imparts an attractive appearance thereto. Such appearance may be further enhanced by dyeing or pigmenting the flock in any color as may be desired. The overshoe product may thus be produced in any color and with a variety of patterns and designs thereon, furnishing a clothing accessory having enhanced fashion appeal.

In accordance with a further feature of the present invention, the composite overshoe is produced by flocking at least upper portions of the overshoe body and, preferably, by uniformly flocking both the sole and upper portions thereof and thereafter applying a further rubber coating to the flock layer in the region of the sole portions thereof to form the outer sole of the overshoe. By so proceeding, the composite overshoe exhibiting the aforesaid tear-resistance and improved sole adhesion and abrasion-resistance characteristics may be readily manufactured on a mass production basis.

BRIEF DESCRIPTION OF THE DRAWINGS

The overshoe of this invention and the improved process by which it is made may be more fully understood by reference to the following drawings, in which:

FIG. 1 is a flow sheet indicating the successive steps of a preferred embodiment of the present process;

FIG. 2 is a side elevation, partially broken away, of an overshoe made in accordance herewith; and FIG. 3 is a fragmentary and expanded, diagrammatic section of the overshoe of FIG. 2 taken along line 3—3 and showing the construction of the sole portion of the overshoe.

PREFERRED EMBODIMENTS OF THE INVENTION

Referring initially to FIGS. 2 and 3 of the drawing, the overshoe 10 illustrated is of the boot type formed by the deposition of one or more rubber coatings on a suitable mandrel or form in the manner indicated hereinafter. In the embodiment shown the overshoe comprises an upper or body portion 11 and a lower or sole portion 12. The boot 10 includes a first or inner rubber layer 13, a second or adhesive rubber layer 14, and a flock layer 15. The rubber side walls of the boot may typically be within the range of from about 0.025 to 0.050 inch thick. The sole portion 12 of the boot is additionally provided with a third or outer sole rubber layer 16, the flock layer being embedded in and bonded to each of the rubber layers 14 and 16 of the sole and enhancing and strengthening the rubber-rubber bond therebetween. It has been found that the flock layer 15 thus imparts increased tear-resistance to the body portion 11 of the overshoe and improves adhesion and abrasion-resistance of the layer 16 adhered to the sole portion 12 thereof.

The term "rubber(s)" referred to above or elsewhere herein comprehends any of the various known types of vulcanizable elastomers or rubbers, including natural rubber, and the synthetic rubbers comprising chloroprene, isoprene (including isoprene-isobutene copolymers and other butyl rubbers), or butadiene (e.g. butadiene-styrene or butadiene-acrylonitrile copolymers) polymer rubbers, polybutene, polysulfide and polyurethane rubbers, or the like. While any of the aforesaid rubbers may be employed in the overshoe product of this invention, natural rubber will be referred to hereinafter as illustrative.

The boot 10 of FIG. 2 may conveniently be manufactured employing the successive steps illustrated in the flow sheet of FIG. 1. Employing a coagulant-type rubber latex, the desired form (which may, of course, incorporate corrugations on the sole portion thereof, decorative identations on the body portion, or any other desired design features) is initially immersed in a suitable coagulant dip 17; the coagulant may be any of the known types utilized in connection with rubber latices. The coagulant film is thereafter dried in step 18.

The form is then immersed in a first or latex dip 19 in which the first, relatively thick layer 13 defining the envelope or body portion of the overshoe is formed. Natural rubber latices utilized in such a dip typically have solids concentrations ranging from about 20 to 70 percent by weight. The latex dip may further include conventional additives, such as stabilizers, anti-oxidants, sulfur, zinc oxide, accelerators, and any desired colorants. Materials known in the art to be used for such purposes may suitably be employed in the latex dips used in accordance with this invention.

Preferably, the natural rubber latex dip utilized in step 19, as well as the latices employed in the subsequent dipping operations of steps 21 and 24, described hereinafter, incorporates the following ingredients in the noted ranges of proportions:

| Natural Latex Body Dip Compound | Range of Proportions by Weight (Dry) |
| --- | --- |
| Natural rubber latex | 100 parts |
| Stabilizer | 0 to 10 parts |
| Anti-oxidant | 0 to 10 parts |
| Sulfur dispersion | 0.25 to 8.0 parts |
| Zinc oxide dispersion | 0.25 to 5.0 parts |
| Accelerator dispersion | 0.25 to 5.0 parts |
| Colorant dispersion | 0 to 15 parts |

The above latex compound is suitable for formation of the initial rubber layer 13 by coagulation on the previously applied coagulant film. It should, however, be understood that it is within the purview of the present invention to employ other latex compounds such, for example, as heat-sensitive latices rather than coagulant latices when it is preferred not to employ a coagulant-type system.

After immersion within the latex dip 19 for a dwell time sufficient to produce the desired thickness of layer 13 of the envelope or body portion of the overshoe, the coated form is then dried in step 20. In accordance with the preferred embodiment, it is thereafter immersed in a second latex or adhesive dip 21, in which a further layer of the rubber latex is deposited thereon. Such latex may have the same composition as that utilized in the first latex dip, or may additionally incorporate a further additive or additives for enhancing adhesion of the subsequently applied flock layer thereto.

The second rubber layer 14 is flocked in step 22 employing conventional techniques, e.g., by applying a suitable textile flock from a blower or by deposition with the aid of mechanical vibratory or electrostatic equipment. Methods and compositions suitable for flock application in accordance with the present invention are described, for example, in Rockoff U.S. Pat. No. 2,964,421 of Dec. 13, 1960, and in the patents referred to therein.

Either random or oriented flock constituted of any suitable natural or synthetic fibers may be so applied for formation of flock layer 15. Natural fiber flocks so useful may comprise cotton, wool or hair. Alternatively, synthetic flock materials comprising rayon, nylon, polyester, acrylic or polyolefin fibers, for example, may be utilized. Such fibers may be admixed and may, if desired, be pre-treated for control of the hydrophilic properties thereof.

The flock is distributed over the second rubber layer 14, preferably over the entire outer surface thereof. When the flock is thus applied to areas including the sole portion 12 of the overshoe, it is desirable that its density be so regulated that it is sufficient to impart improved tear-resistance, and sole adhesion and abrasion-resistance characteristics to the overshoe material, on the one hand, without being so great as to interfere with the rubber to rubber bond between layer 14 and the subsequently applied outer sole layer 16, on the other hand. For such purpose, and employing a cotton flock having a bulk density within the range of about 0.1–0.7 grams/c.c., for example, it is preferred to apply from about 0.001 to 0.1 ounces of flock over the sole portion of the overshoe per square inch of the surface area thereof. With other flock materials differing ranges of densities of flock application may be employed.

Flock layer 15 is dried in step 23 and the boot immersed within a final sole dip 24 for formation of the outer sole layer 16. The sole dip may comprise the same rubber latex employed for formation of the body portion of the overshoe or, preferably, may additionally incorporate particulate matter and other additives for improving the frictional characteristics of the overshoe sole. Materials useful as particulate matter include comminuted cork, crum rubber, walnut or other type of nut shells, or wood particles or other natural cellulose granules. The sole dip may, for example, incorporate (per 100 parts of the rubber latex on a dry weight basis) from 1 to 30 parts of such additive, from 0 to 10 parts of a resin, and from 0 to 30 parts of an appropriate filler, in addition to the further ingredients identified above in connection with the body dip compound.

After removal from the sole dip, the boot is subjected to successive air-drying and low temperature oven drying steps 25 and 26. It is thereafter leached in running water in step 27, subjected to a further low temperature oven drying operation 28, and finally oven cured in step 29. After the cure, the completed boot or other overshoe is stripped from the form.

Employing natural rubber latices, air-drying steps 20 and 25 for drying the inner body layer and outer sole layer of the overshoe may be conducted under ambient conditions. The low temperature oven drying steps 23, 26 and 28 for drying the flock layer and sole coatings of such article, respectively, may be carried out at somewhat elevated temperatures of, for example, from about 130° to 180° F. The final oven cure of the natural rubber product may be conducted for periods of from about one half to 2 hours and at temperatures of up to the reversion temperature of the rubber involved, preferably from about 230° to 280° F. The respective drying times and temperatures may, of course, be widely varied, depending upon the particular compounds used for forming the respective coatings, the rubber or rubbers employed therein, and the relative importance of achieving decreased processing times by the use of increased drying and/or curing temperatures.

The following examples further illustrate preferred techniques for carrying out the process and for manufacturing the product of the present invention, and indicate some of the advantages achieved in accordance therewith.

Composite flocked rubber materials suitable for overshoe manufacture were made by the successive dip-coating, flocking, drying and curing operations outlined in FIG. 1 of the drawing.

The coagulant dip utilized in step 17 of the process had the following composition:

| Coagulant Compound | Range of Proportions by Weight (Dry) |
|---|---|
| Calcium nitrate | 100 |
| Alcohol | 100 |
| Water | 50 |
| Wetting agent | 0.625 |

The body compound employed in latex dip step 19 had the following composition:

| Natural Latex Body Compound | Range of Proportions by Weight (Dry) |
|---|---|
| Natural rubber latex (about 60% solids concentration) | 162.00 |
| Stabilizer | 2.72 |
| Anti-oxidant | 1.67 |
| Sulfur dispersion | 2.50 |
| Zinc oxide dispersion | 3.00 |
| Accelerator | 2.20 |
| Carbon Black colorant dispersion | 4.00 |

The latex formulation employed for adhesive dip 21 was the same as that utilized in step 19. The sole dip employed in step 24, on the other hand, additionally included the following further ingredients:

| Natural Latex Sole Compound Additives | Range of Proportions by Weight (Dry) |
|---|---|
| Water | 18.30 |
| Resin | 2.02 |
| Cork powder (between 40 and 50 mesh) | 5.06 |
| Clay Dispersion | 21.30 |

TESTING OF MECHANICAL PROPERTIES

For purposes of obtaining test samples, a dipping plate was successively immersed in the coagulant dip 17 maintained at a temperature of about 100° F, and in the latex, adhesive and sole dips 19, 21 and 24, each of which was maintained at ambient temperature (about 70° F). The coagulant, first layer latex and outer sole layer drying steps 18, 20 and 25 were also carried out at ambient temperature. The flock and sole low temperature drying steps 23, 26 and 28 were carried out at temperatures of about 140°–160° F. Final oven curing 29 was effected at a temperature of about 230°–250° F. Intermediate drying step 23 was carried out for only about five minutes to facilitate subsequent adhesion of the sole layer 16, while the final oven cure 29 was completed in about one hour.

Samples thus formed on the dipping plate were compared with similar samples made in the same manner but without the application of an intermediate flock layer (namely, without the use of intermediate step 22) with respect to tear strength, adhesion of the rubber laminae (peel strength), and abrasion resistance.

COMPARISON OF TEAR STRENGTH

A number of samples were made as described hereinabove but without the application of the sole dip 24. Six such samples made with an intermediate flock layer were compared with six similar samples made in like manner but without the application of such a layer. The tear strengths of the respective samples were determined by a tear test based upon ASTM-D-624-54, employing a 90° tear die and an Instron Tensile Tester. The tear strengths were determined as the pounds of force required to effect rupture of the individual specimens per unit thickness of the specimen at the 90° angle at which rupture was effected.

The samples incorporating flock layers (hereinafter the "flocked samples") required from 518 to 565 pounds force per unit gauge, or an average of 534 pounds, to effect rupture. On the other hand, from 375 to 500 pounds force per unit gauge, or an average of 456 pounds, was sufficient to rupture the samples not incorporating such flock layers (hereinafter the "unflocked samples"). The flocked samples thus exhibited approximately 17 percent greater tear-resistance or tear strength than the unflocked samples.

COMPARISON OF PEEL STRENGTH

The peel strength or adhesion of further flocked and unflocked samples produced as described hereinabove were compared employing the following test. First, the following four groups of flocked and unflocked test samples were prepared as described above employing, however, the following further processing modifications:

Test Group I — Seven Samples: Flocked samples prepared as previously described, the intermediate drying step 23 being completed in 5 minutes;

Test Group II — 11 Samples: Unflocked samples prepared as described above without the use of intermediate step 22 and in which the subsequent drying step 23 was completed in 5 minutes;

Test Group III — 72 Samples: Flocked samples prepared as previously described, the intermediate drying step 23 being carried out for a total of 30 minutes;

Test Group IV — 27 Samples: Unflocked samples prepared as described above without the use of intermediate flocking step 22 but in which the subsequent drying step 23 was carried out for a total of 30 minutes.

The peel strength of the respective test samples (the resistance to delamination) was determined employing an Instron Tester, the rubber plies being separated at a speed of 12 inches plus or minus 0.5 inch per minute. The resulting peel curves were plotted and the average stress peaks were determined for each sample and each test group. The following results were obtained:

| Test Group | Average Peel Strength (pounds) | Improved Peel Strength of Flocked Samples |
|---|---|---|
| I. (Flocked Samples, 5 min. drying time) | 7.30 | 31.8% greater than II |
| II. (Unflocked Samples, 5 min. drying time) | 5.54 | — |
| III. (Flocked Samples, 30 min. drying time) | 6.74 | 63% greater than IV |
| IV. (Unflocked Samples, 30 min. drying time) | 4.14 | — |

It may be seen from the preceding that the composite flocked rubber samples exhibited substantially improved peel strengths or adhesions of the plural rubber laminae thereof. Such was the case irrespective of variation of the period employed for the low temperature oven drying of the composite material intermediate the successive application of the rubber laminae thereof.

COMPARISON OF ABRASION-RESISTANCE

The following further test samples were prepared in accordance with the technique described above; the individual test samples differing only as follows:

Sample A-1: A flocked sample prepared without the addition of cork or the other above-noted additives to the sole compound;

Sample A-2: An unflocked sample prepared without the addition of cork or the other above-noted additives to the sole compound;

Sample B-1: A flocked sample prepared using the cork and other additive-containing sole dip described above;

Sample B-2: An unflocked sample prepared using the cork and other additive-containing sole dip described above.

The respective test materials were subjected to test in a Taber Abrader to determine the relative abrasion-resistance of the respective sheet materials. The test samples were placed on a rotating disc specimen holder and an abrasive wheel under a 1,000 gram load was placed thereon. The number of revolutions of the specimen holder required to wear entirely through each sample was determined. The following results were obtained:

| Test Sample | Revolutions to Failure | Improved Abrasion-Resistance of Flocked Sample |
|---|---|---|
| A-1 | 8475 | 23.6% greater than A-2 |
| A-2 | 6857 | — |
| B-1 | 5283 | 15.1% greater than B-2 |
| B-2 | 4590 | — |

It may be seen from the preceding that the flocked sample sheet materials prepared in accordance with the present invention exhibited markedly improved abrasion-resistance characteristics irrespective of variation in the intermediate drying period or modification of the composition of the outer rubber lamina.

It will be understood that various changes may be made in the compositions and process steps and conditions employed in the above preferred embodiments without departing from the scope of the present invention. Thus, for example, after step 21 the sole portion 12 of boot 10 may be masked and the flock solely applied in step 22 to the body portion 11 thereof. When such a masking operation is employed, it is not necessary to subsequently apply the outer sole rubber layer 16 and processing steps 24–28 may, therefore, be omitted. As indicated hereinabove, the body portion of the overshoe thus formed exhibits superior tear-resistance, as compared with rubber overshoes which have not been flocked in accordance with this invention. It is, nevertheless, preferred to uniformly apply the flock layer and to overcoat the sole portion thereof with the outer sole layer as described hereinabove, in view of the improved sole adhesion and abrasion resistance characteristics thus produced. Further, the intermediate masking operation is not preferred since the use of such a step imposes material-handling problems in large scale, commercial operations.

Since the preceding and other modifications may be made in the previously described preferred embodiments of the invention without departing from the scope thereof, it is intended that the invention should be construed solely in the light of the following claims.

What is claimed is:

1. An overshoe comprising a flexible rubber body having an upper portion and a sole portion, a layer of flock embedded in and bonded to both the upper and sole portions of the body, and an outer layer of flexible rubber bonded to the flock layer in the region of the sole of the overshoe and defining the outer sole thereof.

2. The overshoe of claim 1 wherein the rubber of said body is selected from the group consisting of natural rubber, chloroprene, isoprene, butadiene, polybutene, polysulfide, polyurethane and mixtures thereof.

3. The overshoe of claim 1 wherein said flock is a fiber selected from the group consisting of cotton, wool, hair, rayon, nylon, polyester, acrylic, polyolefin and mixtures thereof.

4. The overshoe of claim 1 wherein the rubber of said outer layer is selected from the group consisting of natural rubber, chloroprene, isoprene, butadiene, polybutene, polysulfide, polyurethane and mixtures thereof.

5. The overshoe of claim 1 wherein a particulate matter is distributed throughout said outer layer of flexible rubber.

6. The overshoe of claim 5 wherein said particulate matter is selected from the group consisting of comminuted cork, crum rubber, nut shells, wood particles and mixtures thereof.

7. A flexible rubber overshoe comprising a natural rubber body having an upper portion and a sole portion, a layer of cotton flock embedded in and bonded to both the upper and sole portions of said body, and an outer layer of natural rubber, having comminuted cork distributed therethrough, bonded to said flock layer and said body in the region of the sole of the overshoe and defining the outer sole thereof.

* * * * *